UNITED STATES PATENT OFFICE.

BENNO HOMOLKA, OF FRANKFORT-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

PURIFYING RAW INDIGO.

SPECIFICATION forming part of Letters Patent No. 702,730, dated June 17, 1902.

Application filed October 15, 1901. Serial No. 78,686. (No specimens.)

*To all whom it may concern:*

Be it known that I, BENNO HOMOLKA, Ph. D., a citizen of the Empire of Germany, residing at Frankfort-on-the-Main, Germany, have invented certain new and useful Improvements in Purifying Raw Indigo, of which the following is a specification.

Raw indigo, especially such as is obtained after the process of K. Heumann, by heating phenylglycin, its homologues, and their carboxylic acids with caustic alkalies or by heating said bodies with alkali-amids, always contains a not inconsiderable quantity of brown-red to red colored by-products. Some of these are readily soluble in dilute mineral acids, as well as in the usual solvents, (alcohol, acetone, &c.,) and consequently may easily be eliminated. The others, however, obstinately resist all solvents coming into practical consideration, and therefore cannot be separated from the raw indigo, thus causing difficulties in dyeing with the latter.

My process is based on the hitherto-unknown fact that the accessory products of raw natural indigo as well as of raw artificial indigo are readily soluble in pyridin and its homologues, which may be eliminated by extracting raw indigo with pyridin bases.

The pyridin bases practically to be considered are those obtained from coal-tar, slate-tar, brown coal-tar, and bone-oil after known methods and, if necessary, purified by distillation.

The practical carrying out of the invention may be illustrated, for instance, as follows:

Example: Into a suitably-arranged vessel provided with an agitator and standing in a water-bath (kept cool at first) are introduced four hundred to five hundred kilos of the above-named bases, to which are added, with stirring, one hundred parts, by weight, of ground raw indigo. The water-bath is then heated to boiling-point and the indigo exposed for some hours to the action of the pyridin. The mass is then filtered in a filter-press and the indigo is washed in the press with fresh pyridin till it runs off no longer red, but colorless or feebly bluish. The indigo is then freed from pyridin by boiling it with water and finally with dilute acids, then dried and put into marketable condition.

Having now described my invention, what I claim is—

The herein-described process of purifying raw indigo, which consists in extracting raw indigo with pyridin bases, substantially as set forth.

In testimony that I claim the foregoing as my invention I have signed my name in presence of two subscribing witnesses.

BENNO HOMOLKA.

Witnesses:
 ALFRED BRISBOIS,
 JOHANN HARTENSTEIN.